United States Patent Office 3,387,914
PROCESS FOR DYEING OR PRINTING MATERIALS OF FIBROUS STRUCTURE CONTAINING HYDROXYL GROUPS
Erwin Bohnert, Klaus Berner, Fritz Meininger, and Ernst Hoyer, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 14, 1964, Ser. No. 382,627
Claims priority, application Germany, July 17, 1963, F 40,257
10 Claims. (Cl. 8—54.2)

ABSTRACT OF THE DISCLOSURE

A process has been provided for dyeing and printing fibrous materials containing hydroxyl groups by fixing dyestuffs having at least one β-thiosulfato ethylsulfonyl group in the molecule with the aid of an alkaline agent. This process yields very strong dyeings and prints which are very stable to washing and to the action of light.

---

It has now been found that fast dyeings and prints can be prepared on fibrous material containing hydroxyl groups by applying organic dyestuffs containing in the molecule at least one group

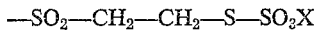
$$-SO_2-CH_2-CH_2-S-SO_3X$$

in which X represents a hydrogen atom or an alkali metal atom, on the material and fixing it at room temperature or at an elevated temperature or by heating in the presence of agents having an alkaline reaction. In order to obtain sufficient solubility in water the dyestuffs used may contain in addition to at least one substituent of the type mentioned one or several groups imparting solubility in water, such as carboxylic acid groups or, above all, sulfonic acid groups.

As soluble organic dyestuffs there may be used dyestuffs of various types, as for example azine, dioxazine, nitro, stilbene or triphenyl methane dyestuffs, in the first place, however, anthraquinone, phthalocyanine and azo dyestuffs, especially metal-free or metal-containing mono- and polyazo dyestuffs.

The dyestuffs used in the process of the present invention may be prepared, for instance, by reacting organic dyestuffs containing at least one vinyl-sulfone group of the formula

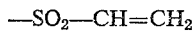
$$-SO_2-CH=CH_2$$

in the molecule, with sodium thiosulfate while neutralizing the hydroxyl ions which are formed during the reaction by introduction of carbon dioxide.

The process of the invention is applicable for producing dyeings and prints on all kinds of natural or synthetic fibrous materials containing hydroxyl groups. Among these materials there may be mentioned, for example, natural or regenerated cellulose materials, such as cotton, linen, hemp or spun rayon, all kinds of polyvinyl alcohol fibers and corresponding fiber mixtures as well as mixed fabrics made of the materials mentioned above and synthetic fibrous materials, such as polyester fibers.

The dyeings and prints on fibrous materials are prepared according to the methods generally used for reactive dyestuffs by means of agents having an alkaline reaction which are applied to the fiber either before the dyestuffs are applied, or simultaneously with them or after they have been applied. It is advantageous to work at temperatures in the range from 10° to 200° C., the period required for fixing being between a few seconds and 48 hours depending on the conditions of the temperature applied and on the type of agent having an alkaline reaction chosen.

The preparation of the dyeings is carried out, for example, by impregnating the goods to be dyed with the dyestuffs or by dyeing in a long bath according to the direct dyeing method. If the dyestuffs have no or at least no pronounced affinity to the fiber it is advantageous to impregnate the material with aqueous—if desired salt containing—dyestuff solutions cold or at a slightly elevated temperature and to squeeze it subsequently.

As agents having an alkaline reaction inorganic compounds are preferably used, for example alkali metal or alkaline earth metal hydroxides, alkali metal bicarbonates, alkali metal carbonates, alkali metal phosphates such as tri-sodium phosphate or mixtures of di-sodium phosphate and tri-sodium phosphate, alkali metal borates, alkali metal salts of tri-chloro-acetic acid or mixtures of these agents having an alkaline reaction.

Further substances may be added to the aqueous dyestuff solutions used for the preparation of the dyeings, above all electrolytes such as sodium chloride or sodium sulfate, urea, dispersing agents, surface-active agents and thickening agents such as sodium alginate.

Subsequent to the impregnation the dyestuffs applied are fixed on the fibrous material by subjecting the impregnated material to a heat treatment, if desired after an intermediate drying. If the fibrous material has been impregnated for example in the presence of an alkali metal hydroxide, the fixation of the dyestuffs may also be carried out at room temperature or at a slightly elevated temperature by leaving the impregnated material for several hours. When using practically neutral impregnating baths the fixation of the dyestuffs is advantageously carried out by introducing the impregnated goods into a salt containing alkali bath and then subjecting them to the heat treatment. Appropriate combination of temperature and pH-value permits the fixation of the dyestuffs to be effected also during the dyeing process.

Instead of applying the dyestuffs by impregnation or direct dyeing in a long bath they may also be printed on the fiber goods to be dyed. For this purpose the dyestuffs are mixed with the usual auxiliary agents, for instance urea, dispersing agents, the sodium salt of nitrobenzene sulfonic acid, thickening agents such as methyl cellulose, starch ether, alginate thickenings or emulsion thickenings and an agent of the type mentioned above having an alkaline reaction and printed on the goods. The dyestuffs are fixed on the fibrous material—if desired, after intermediate drying—by the action of heat or by a heat treatment, preferably by steaming or dry developing processes, for example by heat setting.

It is also possible to apply a printing paste containing one or several dyestuffs of the type mentioned to the fabric impregnated with an acid binding agent and to heat the printed fabric subsequently, for instance by steaming. Moreover, the fibrous materials may be printed first with a printing paste containing one or several dyestuffs and then treated, at a temperature in the range from about 60° to 100° C., with an aqueous solution of acid binding agents, preferably in the presence of electrolytes such as sodium chloride or sodium sulfate.

The surprising fact that the group of the formula $-SO_2-CH_2-CH_2-S-SO_3H$ which is contained in the dyestuffs used in the process of the invention reacts with the hydroxyl groups of the cellulose material during the action of the agents having an alkaline reaction could not be foreseen, since, as is known, dyestuffs containing a thiosulfuric acid group linked either directly or via an aliphatic bridging member to the dyestuff molecule are transformed, under alkaline conditions, into dyestuff disulfides or polysulfides.

As compared with other processes wherein dyestuffs containing the grouping —SO₂—CH₂—CH₂—O—SO₃H are used, the process of the invention offers the advantage of permitting to work in the presence of large amounts of electrolytes and to use high-percentage padding liquors and printing pastes. Moreover, the dyebaths and printing pastes prepared with the dyestuffs used according to the process of the invention are distinguished by a much higher stability to alkalies, thus ensuring prolonged applicability of the dyebaths and printing pastes. This is most important especially when applying the cold-pad-bath process.

According to the process of the present invention valuable, even and very strong dyeings and prints which are very stable to washing and to the action of light are obtained on cellulose containing fibrous materials. The dyestuffs used in the process of the invention are superior to the dyestuffs of comparable constitution containing the group —SO₂—CH₂—CH₂—O—SO₃H with regard to tinctorial strength and evenness of the dyeings and prints on cotton.

The following examples serve to illustrate the present invention without intending to limit it thereto, the parts being by weight unless otherwise stated.

Example 1

30 parts of the dyestuff of the formula

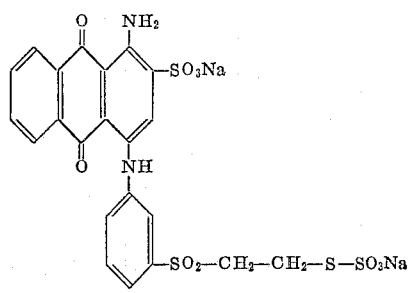

obtainable by addition of sodium thiosulfate on the vinylsulfone dyestuff of the formula

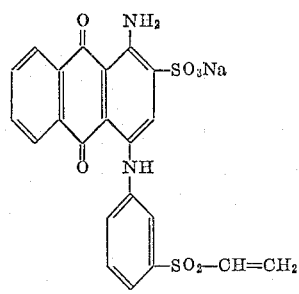

in an aqueous medium while introducing carbon dioxide, are dissolved in 1000 parts of water, and then 6 parts of sodium hydroxide and 30 parts of sodium sulfate are added at 20° C. A cotton fabric is impregnated with this solution and squeezed to a liquor uptake of 80% referred to its dry weight. The material treated in this manner is rolled up, wrapped up in a polyethylene foil and left there for several hours at room temperature. It is then neutralized and rinsed with cold, hot and boiling water.

An even blue dyeing is obtained which is distinguished by a pure shade, good wet fastness properties and a very good fastness to light.

When using 30 parts of the known dyestuff of the formula

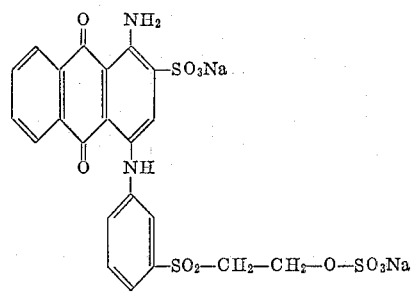

instead of the dyestuff described above the dyeings obtained are uneven and have a lower tinctorial strength.

Example 2

100 parts of fibrous material made of regenerated cellulose are dyed for 90 minutes in 3300 parts of a dye liquor of 60° C. containing 1 part of the dyestuff described in Example 1 which contains a sulfonyl ethyl thiosulfuric acid group, 300 parts of sodium sulfate and 30 parts of sodium carbonate. The dyeing is carried out as described in Example 1. A strong, brilliant blue dyeing is obtained having fastness properties which correspond to those mentioned in Example 1.

When using in the above example a fabric made of polyvinyl alcohol fibers instead of regenerated cellulose there is likewise obtained a strong blue dyeing which is distinguished by very good wet fastness properties and a very good fastness to light.

Example 3

2 parts of the dyestuff of the formula

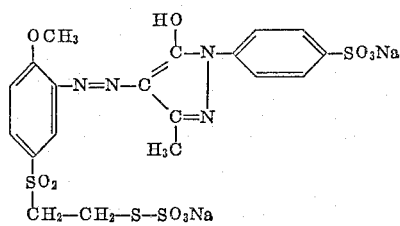

which is obtained by reacting the dyestuff of the formula

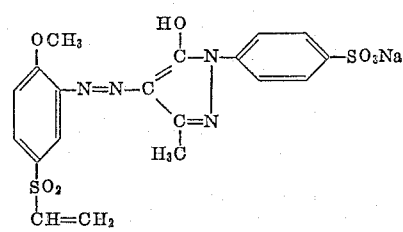

With sodium thiosulfate in an aqueous medium while introducing carbon dioxide, and 4 parts of urea are dissolved in 15 parts of water. 2 parts of the sodium salt of tri-chloroacetic acid are added to this solution, then the mixture is made up to 50 parts with a 4% alginate thickening and thoroughly stirred.

The cotton fabric printed with the paste prepared in this manner is dried, steamed for 5–6 minutes at 100–103° C., rinsed with cold and hot water, and after-treated with a solution containing 3 g. of soap and 1 g. of sodium carbonate per liter. A clear yellow print is obtained having a good fastness to light and wetting.

Example 4

20 parts of the dyestuff described in Example 3 are dissolved in 1000 parts of water. 2 parts of sodium hydroxide and 7.5 parts of tri-sodium phosphate are added to this solution at 10–20° C. A linen fabric is impregnated with this padding liquor and squeezed to a dye liquor absorption of 80% of its dry weight. It is then rolled up and treated subsequently as described in Example 1. A clear strong greenish yellow dyeing is obtained having a good fastness to wetting and light.

In the alkaline dye liquor mentioned above the dyestuff used according to the process of the invention is converted much more slowly into a form in which it cannot be fixed on the fiber than the corresponding dyestuff containing the group —$SO_2$—$CH_2$—$CH_2$—O—$SO_3Na$ instead of the group —$SO_2$—$CH_2$—$CH_2$—S—$SO_3Na$.

Example 5

2 parts of the azo dyestuff of the formula

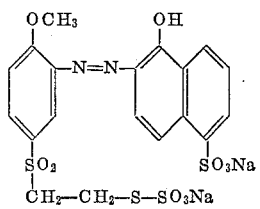

obtained by reacting the dyestuff of the formula

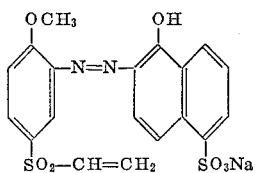

with sodium thiosulfate in an aqueous medium while introducing carbon dioxide, and 4 parts of urea are dissolved in 15 parts of water. 1 part of sodium bicarbonate is added to this solution and the mixture is then made up to 50 parts by means of a 4% alginate thickening and thoroughly stirred.

The cotton fabric printed with the paste prepared in this manner is dried, steamed for 5–6 minutes at 100° C., rinsed with cold and hot water and then treated at the boil with a solution containing 3 g. of soap and 1 g. of sodium carbonate per liter. A clear red print is obtained having good wet fastness properties.

Example 6

20 parts of the dyestuff described in Example 5 and 50 parts of urea are dissolved in 200 parts of hot water. 400 parts of an aqueous 8% alginate thickening which is stable to alkali and 20 parts of sodium bicarbonate are added, with stirring, to the solution obtained. Subsequently, the whole is made up to 1000 parts by mixing with water and thickening and the mixture is thoroughly stirred.

A fabric made of cellulose fibers is printed with the printing paste thus obtained. The dyestuff is fixed by dry heating for 3 minutes to 140° C. After finishing by soaping at the boil and rinsing a bright red print is obtained having good wet fastness properties.

Example 7

A cotton fabric is impregnated with a solution of 20 parts of a 33% sodium hydroxide solution in 1000 parts of water, squeezed and dried. The goods treated in this way are printed with a printing paste of the following composition:

20 parts of the dyestuff described in Example 1 containing a sulfonyl ethyl thiosulfuric acid group,
50 parts of urea,
400 parts of a 4% alginate thickening,
530 parts of water.

After drying, the printed goods are steamed for 5 minutes at 101–103° C. and finished in the usual manner by rinsing and soaping. A clear blue print is obtained having good properties of wet fastness and a very good fastness to light.

Example 8

20 parts of the dyestuff described in Example 3 and 50 parts of urea are dissolved in 200 parts of hot water. This dyestuff solution is mixed, while stirring, with 500 parts of an emulsion thickening and 30 parts of sodium bicarbonate. The mixture is then made up to 1000 parts by means of water and thickening. (The emulsion thickening is prepared by mixing 450 parts of an aqueous 4% alginate thickening, 10 parts of a product obtained by condensation of polyethylene glycol and fatty acid, 240 parts of water and 300 parts of heavy benzene.)

A cotton fabric is printed with the printing paste thus obtained, steamed and finished as described in Example 3. A yellow print is obtained having good wet fastness properties and a very good fastness to light.

Example 9

A fabric made from mercerized cotton is impregnated with a dyestuff solution of 20 parts of the dyestuff mentioned in Example 1 containing a sulfonyl ethyl thiosulfuric acid group in 1000 parts of water, the fabric is then squeezed to a liquor absorption of 80% referred to its dry weight and dried. The goods are then treated, at room temperature, with an aqueous alkaline salt solution containing 250 g. of sodium chloride and 10 g. of sodium hydroxide per liter. After having been squeezed to a liquor absorption of 80% the goods are steamed during 30 seconds at 100–102° C., acidified, rinsed at the boil and dried. A clear blue dyeing is obtained having good wet fastness properties and a very good fastness to light.

The following table contains a number of further dyestuffs suitable for use in the process of the invention as well as the shades of the dyeings and prints obtained on cellulose materials.

| No. | Composition of dyestuff | Tint |
|---|---|---|
| 1 | | Bluish red. |
| 2 | | Black. |

| No. | Composition of dyestuff | Tint |
|---|---|---|
| 3 | [structure: copper phthalocyanine with sulfonate and sulfonamide-phenyl-SO₂-CH₂-CH₂-S-SO₃Na groups] | Turquoise blue. |
| 4 | [structure: copper complex azo dye with SO₂-CH₂-CH₂-S-SO₃Na and NH-CO-CH₃ groups] | Violet. |
| 5 | [structure: pyrazolone azo dye with OCH₃, SO₂-CH₂-CH₂-S-SO₃Na and SO₂-CH₂-CH₂-O-SO₃Na groups] | Yellow. |
| 6 | [structure: pyrazolone azo dye with S-CH₂-CH₂-O₂S-, SO₃Na, OCH₃ groups and SO₃Na] | Golden yellow. |
| 7 | Copper complex compound of the azo dyestuff of the formula: [structure with S-CH₂-CH₂-O₂S-, SO₃Na, OH groups and SO₂-CH₂-CH₂-S-SO₃Na] | Brown. |
| 8 | [structure: azo dye with NH-CO- bridge, SO₂-CH₂-CH₂-S-SO₃Na, NaOOC, and SO₃Na groups] | Yellow. |
| 9 | [structure: naphthalene azo dye with H₃CO, O₂S-H₂C-H₂C-S-SO₃Na, OCH₃, NaO₃S, OH, NH-CO-CH₃ groups] | Red. |
| 10 | [structure: SO₃Na, NH₂, naphthalene azo dye with SO₃Na and SO₂-CH₂-CH₂-S-SO₃Na groups] | Yellowish orange. |

| No. | Composition of dyestuff | Tint |
|---|---|---|
| 11 | 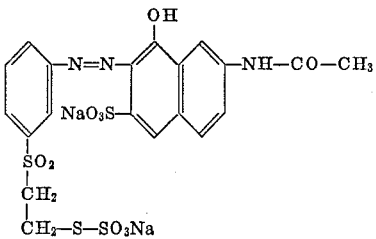 | Reddish orange |
| 12 | 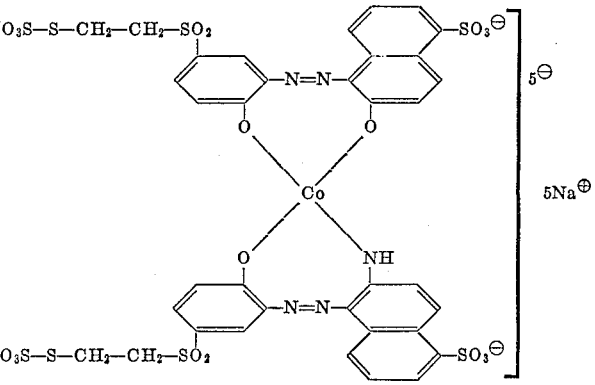 | Grey. |
| 13 | 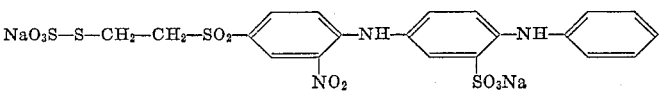 | Brown. |
| 14 | 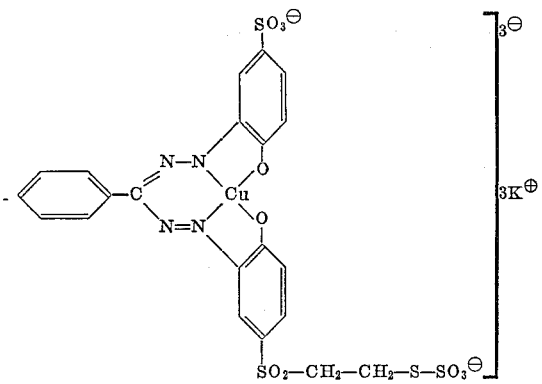 | Greenish blue. |
| 15 | 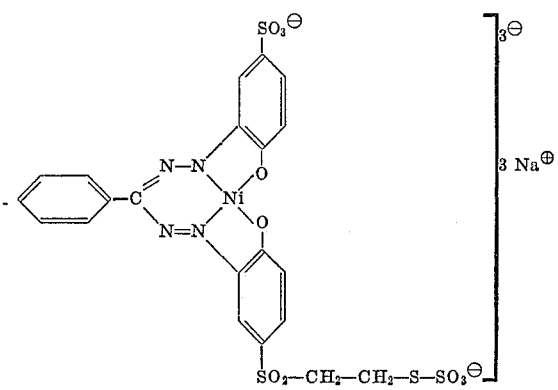 | Brown velvet. |
| | Iron complex of: | |
| 16 | 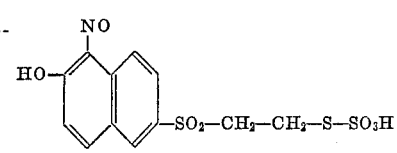 | Green. |

| No. | Composition of dyestuff | Tint |
|---|---|---|
| 17 | 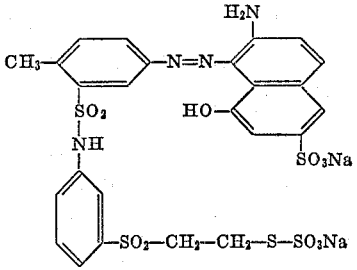 | Yellowish red. |
| 18 | 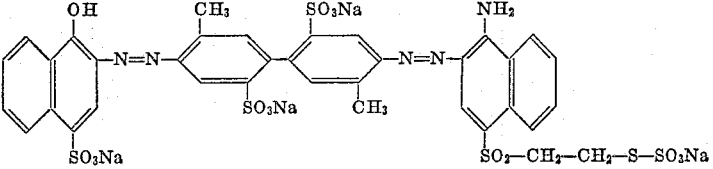 | Orange. |
| 19 | 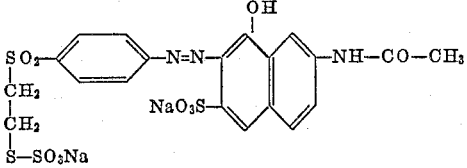 | Do. |
| 20 | 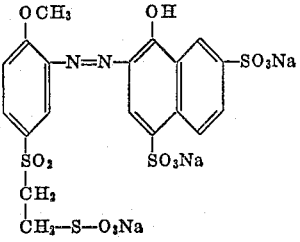 | Red. |
| 21 | 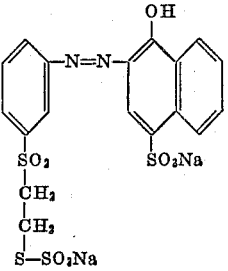 | Orange. |
| 22 | 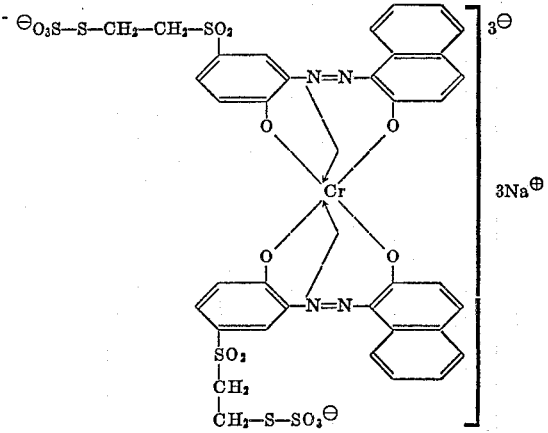 | Brown violet. |

| No. | Composition of dyestuff | Tint |
|---|---|---|
| 23 | (structure: Ni complex phthalocyanine-type with NaO₃S and SO₂—NH—C₆H₄—SO₂—CH₂—CH₂—S—SO₃Na substituents) | Bluish green. |
| 24 | (structure: Co complex with two azo-pyrazolone ligands bearing $\ominus O_3S-S-CH_2-CH_2-SO_2$ groups and chlorophenyl groups; $3^\ominus$, $3 Na^\oplus$) | Yellow brown. |
| 25 | (structure: Cr complex analogous to 24 with phenyl instead of chlorophenyl; $3^\ominus$, $3 Na^\oplus$) | Orange. |
| 26 | (structure: Co complex of azo-naphthol with $\ominus O_3S-S-CH_2-CH_2-SO_2$ groups; $3^\ominus$, $3Na^\oplus$) | Red brown. |
| 27 | (structure: phenyl-azo-aminonaphthol with HO, SO₃H, and SO₂—CH₂—CH₂—S—SO₃H substituents) | Red. |

| No. | Composition of dyestuff | Tint |
|---|---|---|
| 28 | 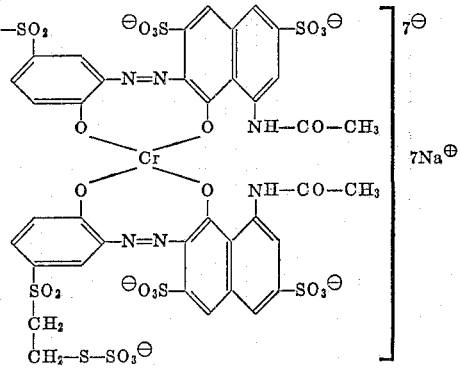 | Navy blue. |

We claim:

1. A process for producing dyeings fast to wet processing on materials of fibrous structure containing hydroxyl groups consisting essentially of applying to these materials water soluble organic dyestuffs containing at least one group of the formula $$-SO_2-CH_2-CH_2-S-SO_3X$$

in which X represents a member selected from the group consisting of a hydrogen, sodium and potassium atom and fixing the dyestuffs on the materials in the presence of non-reducing agents having an alkaline reaction.

2. A process as claimed in claim 1 wherein the dyestuffs are fixed on the material at temperatures between 10 and 200° C.

3. A process as claimed in claim 1, wherein water-soluble dyestuffs are used which contain at least one group imparting solubility in water selected from the group consisting of sulfonic acid groups and carboxylic acid groups.

4. A process as claimed in claim 1, wherein inorganic compounds selected from the group consisting of alkali metal hydroxides, alkaline-earth metal hydroxides alkali metal bicarbonates, alkali metal carbonates, alkali metal phosphates, alkali metal borates, alkali metal salts of trichloroacetic acid and mixtures of these compounds are used as agents having an alkaline reaction.

5. A process as claimed in claim 1, wherein an organic dyestuff of the formula

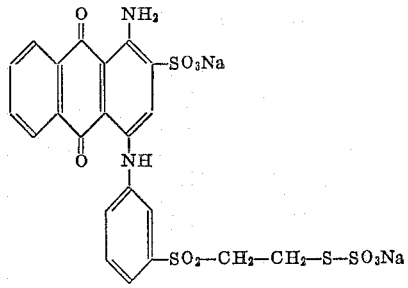

is used.

6. A process as claimed in claim 1, wherein an organic dyestuff of the formula

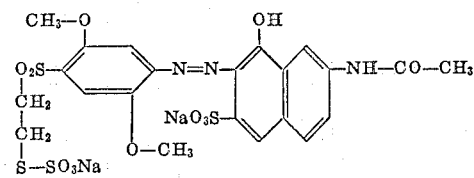

is used.

7. A process as claimed in claim 1, wherein an organic dyestuff of the formula

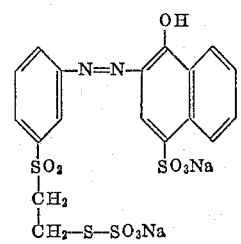

is used.

8. A process as claimed in claim 1, wherein an organic dyestuff of the formula

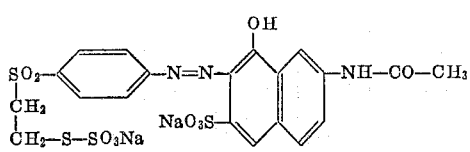

is used.

9. A process as claimed in claim 1, wherein an organic dyestuff of the formula

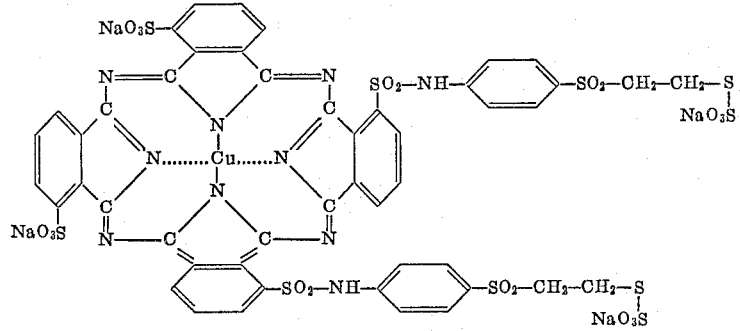

10. A process as claimed in claim 1, wherein an organic dyestuff of the formula
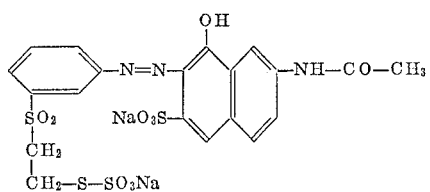
is used.
References Cited
UNITED STATES PATENTS
| | | | |
|---|---|---|---|
| 3,088,790 | 5/1963 | Schultheis et al. | 8—54.2 |
| 3,226,395 | 12/1965 | Schimmelschmidt et al. | 8—1.213 X |
| 3,249,394 | 5/1966 | Staeuble et al. | 8—34 |
| 3,255,173 | 6/1966 | Dehnert et al. | 8—55 X |
NORMAN G. TORCHIN, *Primary Examiner.*
T. J. HERBERT, Jr., *Assistant Examiner.*